Fig. 5

March 14, 1967 M. P. LEBOURG 3,308,882
WELL TESTING METHOD AND APPARATUS
Filed Dec. 24, 1963 6 Sheets-Sheet 3

Maurice P. Lebourg
INVENTOR.

BY John E. Holder
AGENT

March 14, 1967 M. P. LEBOURG 3,308,882
WELL TESTING METHOD AND APPARATUS
Filed Dec. 24, 1963 6 Sheets-Sheet 4

Maurice P. Lebourg
INVENTOR.

BY John E. Holder
AGENT

March 14, 1967 M. P. LEBOURG 3,308,882
WELL TESTING METHOD AND APPARATUS
Filed Dec. 24, 1963 6 Sheets-Sheet 6

Maurice P. Lebourg
INVENTOR.

BY John E. Holder

AGENT

United States Patent Office 3,308,882
Patented Mar. 14, 1967

3,308,882
WELL TESTING METHOD AND APPARATUS
Maurice P. Lebourg, Houston, Tex., assignor, by mesne assignments, to Schlumberger Technology Corporation, Houston, Tex., a corporation of Texas
Filed Dec. 24, 1963, Ser. No. 333,224
35 Claims. (Cl. 166—3)

This invention relates to methods and apparatus for use in a well bore and, more particularly, to methods and apparatus for making multiple flow tests in a well bore and obtaining samples of formation fluids.

In testing earth formations exposed in a well bore, the apparatus used typically includes a packer assembly, a bypass valve, a jar, a safety joint and a tester all of which are suspended in a well bore at the end of a string of pipe. The bypass is used for the convenience of inserting and retrieving the packer by shunting fluid flow around the packer which, of course, is used to pack off selected earth formations from the mud or drilling fluid in the well bore. The jar and safety joint are safety devices used when difficulty is encountered in passing the tool through the well bore. The tester commonly used for open hole testing has a normally closed tester valve which is opened and closed by rotation of the drill string. The flow of fluids from the earth formations are directed to the string of pipe and recovered as flow at the earth's surface or by any method of pumping the fluids to the surface such as by reverse circulation of the drilling fluid.

In testing earth formations traversed by a well bore, it is desirable to obtain as much information as possible about the conditions of the earth formations in a single testing operation thereby minimizing the time that a drilling rig is tied up. In obtaining a sample of the fluids from the formation being tested, it is also advantageous to flow the well for a period of time necessary to purge the formation surrounding the well bore of drilling fluids or filtrate which invade the formation during the drilling operation to obtain a truely representative sample of the formation fluids. Additionally, if several flowing periods may be required to determine pressure build up characteristics of a formation. It may, therefore, be advantageous to intermittently flow the formation and record the pressure of the formation during the intermittent shut-in and flowing periods to provide, for example, information indicative of reservoir depletion, formation permeability or reservoir pressure.

One disadvantage inherent in some previous testing tools has been the utilization of torquing movement of the tubing string to perform various operations of the tool. Torquing has the disadvantage in that all the threaded connections in a tubing string may not be completely made up therefore offering substantial rotating movement of the string before the motion is transmitted to the tool. A tubing string may also become lodged in the hole intermediate the length of tubing permitting the string of tubing to twist above the lodged point and therefore not transferring the rotating motion to the tool. Subsequently, the tubing string may twist itself free and then make several uncontrolled revolutions of the lower part of the tubing string. These features of torquing movement involving the uncertainty of the number of turns of a tubing string give the operator little evidence of the position of the tool elements and the operations being performed by the tool.

The applicant's method and apparatus for performing the desired tests set forth above utilizes a vertical movement of the tubing string to perform the various operations in the tool. This method and apparatus also incorporates the use of a unique packer lock which permits the necessary vertical movement in the tool without unseating the packer.

It is, therefore, an object of the present invention to provide a new and improved formation testing apparatus for making multiple tests in a well bore.

It is also an object of the present invention to provide an improved formation tester for making multiple flow tests and for obtaining a sample of the formation fluids of the last flow test.

Another object of the present invention is to provide a method of and apparatus for making multiple tests of a formation and sampling the formation fluid utilizing longitudinal movement of the testing tool to perform the test operations.

A further object of the present invention is to provide a new and improved formation testing tool and a method of and apparatus for packing off the well bore in such a way as to facilitate longitudinal movement of the testing tool and yet maintain the packer in a set condition.

A still further object of the present invention is to provide a new and improved method of and apparatus for making multiple shut-in tests on a formation and obtaining a sample of the formation fluid in a single running-in of the formation tester.

With these and other objects in view, the present invention contemplates an apparatus and method for making multiple tests on a formation and obtaining a sample of the formation fluid. More particularly, the method includes positioning a flow tube in a formation to be tested and packing-off to isolate a section of the formation, then opening the isolated section to the flow tube at lower pressure than the section, closing the flow tube to shut-in the section while measuring the formation pressures during isolated flowing and shut-in periods, detecting the flow response, and subsequently discontinuing the opening and closing when the flow response is stabilized.

A suitable apparatus for performing this method includes telescopically-mounted members arranged to move longitudinally between a flowing and a shut-in position. A unique arrangement of chambers and passageways in the members provides for flowing the fluids in one of the positions and trapping the fluids in a chamber in the other of the positions. An apparatus for packing-off the well formation and locking the packer expanded during the test enables the testing operation to be performed by longitudinal movement of the testing tool without unseating the packer.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

Figure 1:
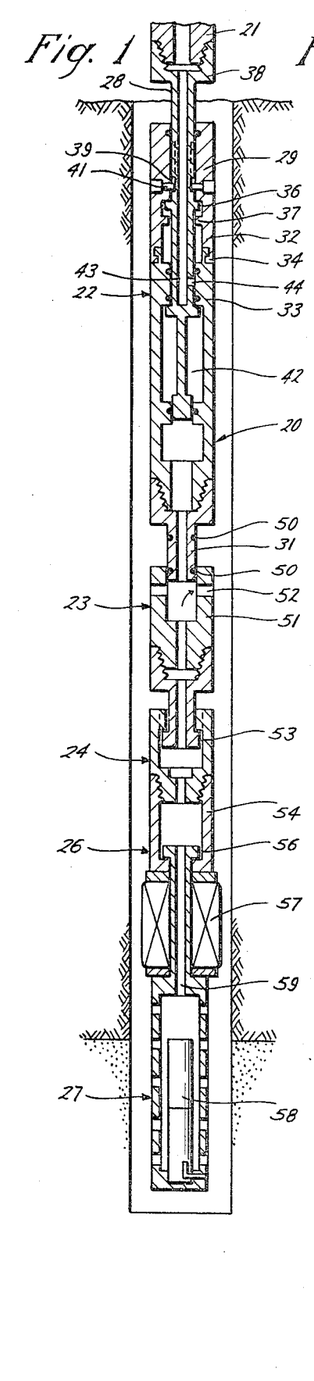
FIG. 1 is a view in elevation of a well tool in accordance with the present invention assembled in a string of pipe arranged for going in or coming out of the well, with the sample chamber shut.
Figure 2:
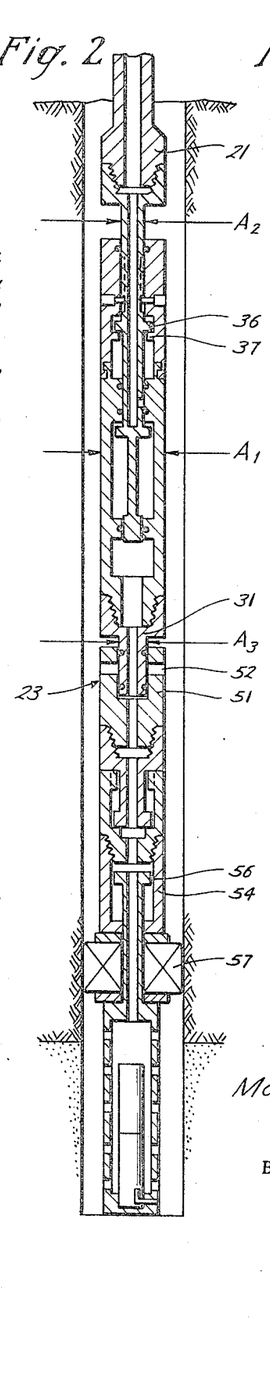
FIG. 2 is a view in elevation showing the well tool setting on the bottom of a hole with the bypass closed and the packer set.
Figure 3:
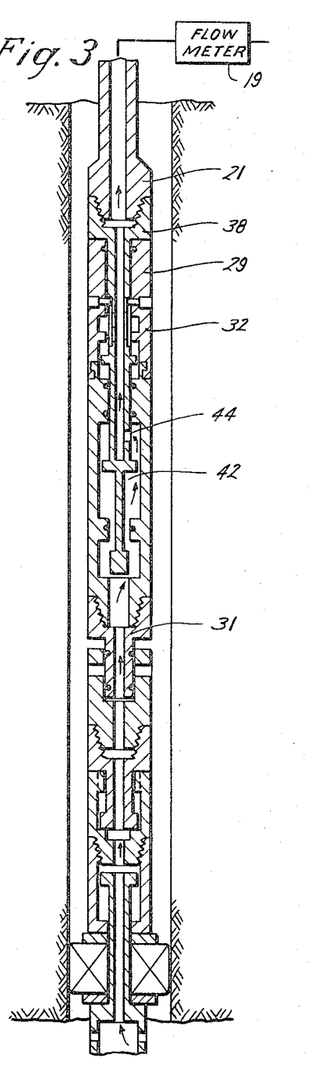
FIG. 3 is a view in elevation of the well tool showing test ports open and the well flowing.

Referring first to FIGS. 1–3, well tool 20 is arranged to be connected to the lower end of a string of pipe or tubing 21 and includes a tester and sampling section 22, a bypass section 23, a safety joint section 24, a packer assembly 26 and a perforated anchor section 27. The tester and sampling section 22 has a mandrel 28 telescopically received within a housing 29, the mandrel 28 and housing 29 repectively being attached between the string of pipe 21 and a mandrel 31 of the bypass section 23. The tester mandrel 28 and housing 29 are relatively movable between expanded, contracted and intermediate telescopic positions.

The tester housing has upper and lower sections 32 and 33 rotatably coupled to one another by a swivel connection 34. The tester mandrel 28 has outwardly extending splines or lugs 36 arranged for abutment with inwardly extending housing splines or lugs 37 in an intermediate telescopic position (as shown in FIG. 2) and the mandrel 28 has a collar 38 which abuts the upper housing section 32 in a contracted telescopic position (as shown in FIG. 1). An indexing system including an indexing slot 39 in the tester mandrel and a cooperating indexing pin 41 in the tester housing is arranged to permit manipulation of the mandrel splines 36 relative to the housing splines 37 and movement of the housing 29 and mandrel 28 between the expanded, contracted and intermediate positions. As will hereinafter be made more apparent, the mandrel 28 can be reciprocated longitudinally between the various positions while the upper housing section 32 is rotated relative to the lower housing section 33.

The lower housing section 33 has an interior portion 42 forming a sample chamber terminated by upper and lower bores of smaller diameter. The mandrel 28 extends through the sample chamber 42 and has upper and lower plug portions for sealing in the housing bores to trap a fluid sample therebetween. Above the upper plug portion, the mandrel has a central bore opening 43 to a lateral test port 44 and to the upper end of the mandrel 28 and thus to the interior of the string of pipe 21. Hence, as illustrated in FIG. 1, the sample chamber 42 and the mandrel test port 44 are simultaneously closed to fluid flow when the mandrel 28 and housing 29 are in an expanded position. When the mandrel is moved downwardly relative to the housing (as shown in FIG. 3), the test port 44 is opened to the sample chamber 42 while the lower plug is displaced from the lower bore permitting flow of fluid via the lower bore, sampling chamber, test port and mandrel bore to the interior of the string of pipe.

Figures 8, 11:
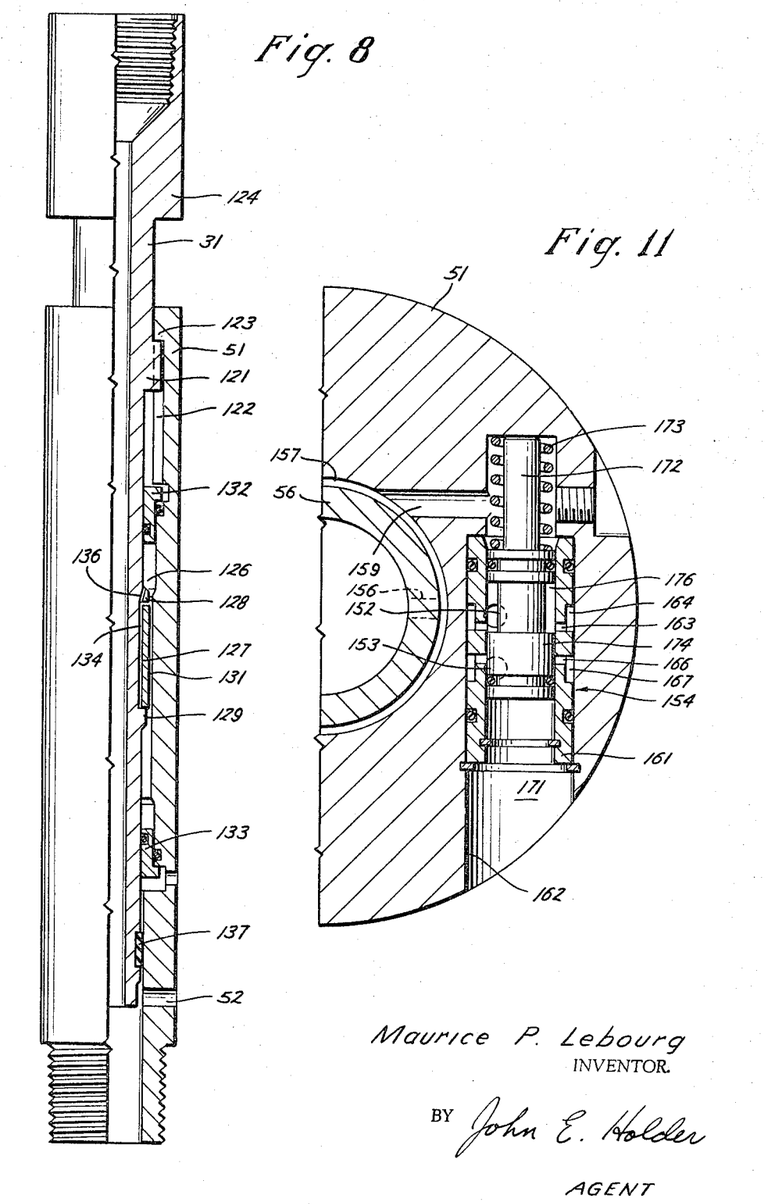
FIG. 8 is a detailed vertical section of an alternative bypass valve.
FIG. 11 is an enlarged detailed cross-sectional view taken along line 11—11 of FIG. 10 of a valve utilized in the packer lock.

The bypass mandrel 31 is threadedly connected to the lower end of the tester housing 29 and is slidably and nonrotatably coupled within a bypass housing 51 by any suitable means (not shown), for example the spline, groove and the flange arrangement shown in FIG. 8 and to be described in detail hereafter. The bypass housing has a bypass port 52 which can be opened or closed by manipulation of the bypass mandrel 31 relative to the bypass housing 51 and is used to shunt fluid to the exterior of the tool as shown by the arrow in FIG. 1.

A system of differential pressures acting on the tester and bypass members retards the opening of the bypass valve while it is closed yet permits unretarded or rapid movement of the valve to a closed condition. This system of differential pressures will be hereinafter described in detail as will an alternative bypass tool incorporating a delay feature which permits rapid closing and slow opening of the bypass.

The bypass housing is, in turn, coupled to a mandrel 53 of a safety joint 24, the safety joint mandrel 53 being telescopically received in a housing of the joint. The safety joint may be, for example, the type shown in U.S. Patent No. 2,708,100. The safety joint housing is, in turn, connected to an upper housing 54 of the packer assembly 26, the packer housing being slidably mounted relative to a tubular packer mandrel 56 carrying a packer element 57. Below the packer element 57, a perforated anchor 27 is attached to the packer mandrel 56. The anchor 27 carries conventional pressure recorders 58 and permits fluid to flow into a bore 59 in the packer mandrel. Two pressure recorders 58 are provided, one recorder measuring pressure externally of the anchor and the other measuring pressure internally of the anchor.

The foregoing brief description is provided to highlight the general organization of the present invention. In general the tool functions in the following manner:

In the operation of the well tool as shown in FIGS. 1–3, the assembled tool is attached to the string of pipe 21 by threadedly connecting the collar 38 on the tester mandrel 28 to the lower section of tubing 21 and suspending each succeeding housing section to the mandrel of the preceding section. When properly made up, each thread joint is fluid tight whereby a continuous flow course is provided upwardly from perforations in the anchor pipe 27 interiorly through the packer 26, the safety joint 24, and through the bypass port 52, when opened, (FIG. 1) into the annular space between the well bore and the tool or through the sample chamber 42, and tester port 44, to the interior of the string of pipe 21 when the bypass port is closed and test valve is open (FIG. 3).

In FIG. 2, the well tools are shown wherein the anchor 27, resting on the bottom retards the movement of the packer mandrel 56 and upon further downward movement of the tools causes the upper packer housing 54 to push down relative to the mandrel 56 and expand the packer element 57 into sealing engagement with the well bore. At the same time the mandrel 31 in the bypass section 23 of the tool is moved downwardly relative to the housing 51 of the bypass tool 23 to close off the bypass port 52 and thereby prevent fluid communication above and below the packer element 57. The packer element 57 having been expanded in the well bore is retained in its expanded condition by a packer lock system to be hereinafter described in detail.

FIG. 3 shows further downward movement of the tubing string 21 forcing the tester mandrel 28 down in relation to the tester housing 29 until the collar 38 abuts the housing 29 and downward force on the tubing string is directly applied to the packer housing 54. This further downward movement of the mandrel 28 opens the test port 44 in the tester mandrel 28 to permit flow of formation fluid through the test port 44 and to the bore 43 of the mandrel and into the string of tubing as shown by the arrows in FIG. 3. Finally, an upward movement on the tubing string 21 followed by a downward movement of the tester mandrel 28 with respect to the housing 29 closes off the testing port 44 and traps a sample of the formation fluid in the chamber 42, (as well as bringing the splines into engagement). In this latter condition the position of the tester members are as illustrated in FIG. 1 while the bypass valve is closed as shown in FIG. 2. The latter two steps, that is opening the test port 44 to permit flow of formation fluid and trapping a sample of fluid in chamber 42, may be repeated any desired number of times or until the flow of fluids from the formation has stabilized.

As will hereinafter be made more apparent, significant features of the present apparatus include the following:

(1) The tester valve is opened and closed by only longitudinal motion of the tubing string.

(2) The tester valve can be repeatedly opened and closed as means are provided to releasably retain the bypass valve closed and the packer element expanded.

(3) A fluid sample of the final flow of fluids is recovered with the tester.

Figures 4A, 4B, 5:
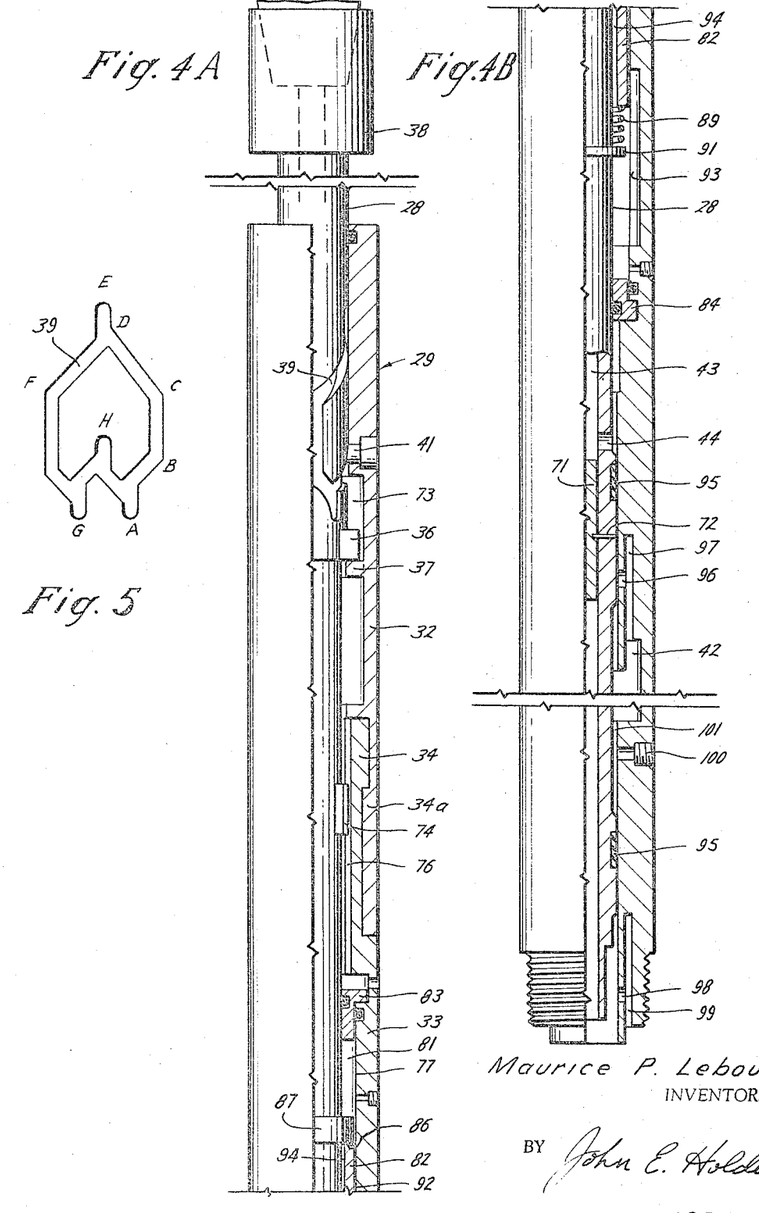
FIGS. 4A and 4B are detailed vertical sections of the well tool showing the testing ports and sample chamber.
FIG. 5 is a developed view of a J or index slot used in the tester.

Referring now to FIGS. 4A and 4B, details of the tester section 22 of the tool will now be described. The tester section 22 generally includes a telescopically-arranged mandrel and housing respectively, arranged for coupling between a pipe string and the other sections of the tool. The tester mandrel 28 has a central bore 43 formed therein and intermediate of the length of the bore is a closure plug 71 (FIG. 4B) shear pinned at 72 to the mandrel and sealingly received therein. The housing 29 is divided into an upper housing section 32 and lower housing section 33 which are rotatably connected to one another by interlocking and cooperating flanges 34, 34a on the sections 32, 33. Flanges 34, 34a provide a swivel type connection so that the upper housing 32 can be rotated with respect to the lower housing 33.

The upper housing 32 has an index pin 41 projecting into an indexing slot system 39 formed in the mandrel 28. The indexing slot system is shown in plan view in FIG. 5 and will hereinafter be more fully explained. The upper housing 32 also has an internal recess 73 with an inwardly-projecting spline or lug 37 disposed intermediate of the length of the recess. Housing spline 37 forms an abutment for an upper spline 36 projecting outwardly from the mandrel 28 into the housing recess 73. Splines 36, 37 are engaged and disengaged by operation of the slot system. Mandrel 28 further has a lower outwardly-extending spline 74 which is slidably received within a longitudinally-extending spline groove 76 in the interior of the lower housing.

The slot system as shown in FIG. 5 includes an upper pocket E, an intermediate pocket H and a pair of lower pockets G and A. The upper pocket and intermediate pocket are longitudinally aligned relative to one another while lower pockets G and A are equidistantly spaced to either side of the intermediate pocket H. Inclined and longitudinal slots are provided to connect the upper and lower pockets as well as the lower and intermediate pockets to one another and guide the index pin in a predetermined manner. For example, if the index pin is initially in the lowermost pocket A, the following sequence of movements will produce the following described travel of the index pin:

(a) Upon downward movement of the mandrel, the index pin is guided from the lower pocket A to the upper pocket E, (b) upon upward movement of the mandrel, the index pin is guided from the upper pocket E to the lower pocket G, (c) upon downward movement, the index pin is guided from the lower pocket G to the intermediate pocket H, (d) upon longitudinal movement of the mandrel upwardly relative to the upper housing, the index pin is guided from the intermediate pocket H to the lower pocket A.

From this description, it will be readily grasped that as the mandrel is moved longitudinally up and down, the index pin will follow a predetermined cyclic path. Hence, with the lower housing section 33 held stationary, the spline 74 and spline groove 76 maintain the mandrel 28 against rotation and the upper housing section 32 will be rotated by virtue of the index pin 41 following the slot system.

The slot system functions to place the upper housing spline 37 and mandrel spline 36 in engagement when the index pin is in the intermediate pocket H so that downward forces can be transmitted from the mandrel directly to the housing 29 and specifically, the lower housing 33 via the splines 36, 37, and the upper housing 32. In this manner, the mandrel 28 can be pushed down on the housing 29. When the index pin is moved to the lower pocket A and thence toward the upper pocket, the splines are meshed when the index pin moves between points B and C on the slot system (by virtue of relative rotational displacement) and the collar 38 on the upper end of the mandrel 28 can be brought into abutting relationship with the upper end of the upper housing section 32 when the index pin is moved to the upper pocket E so that the mandrel can again be pushed down on the housing.

The lower housing 33, below the spline grooves 76, has a bore portion 77 with an enlarged internal diameter forming a cylinder 81 which receives a hydraulic delay piston 82 in the form of a sleeve between the cylinder wall and the mandrel. This annulus formed between the bore 77 and mandrel 28 is filled with a hydraulic fluid and sealed by floating annular piston and seal members 83 and 84, positioned at each end of the bore (FIGS. 4A, 4B). The delay piston 82 abuts on one end against an upper, annular valve seat 86 formed by a flange 87 on the mandrel 28. A delay valve spring 89 is disposed between a lower flange 91 on the mandrel 28 and the lower end of the piston 82. Spring 89 normally urges the piston 82 to seat on the valve seat flange 87. The outer diameter of the piston 82 is less than the diameter of the bore 77 to form a restricted orifice 92. Hence, as the mandrel 28 is moved downwardly relative to the housing 29, the piston 82 seats on the valve seat flange 87 and fluid in the cylinder 81 is metered between the piston 82 and cylinder wall 77 through the restricted orifice 92. This has the effect of delaying movement of the mandrel downwardly relative to the housing.

At the lower end of the bore 77 is relief chamber 93 with a larger diameter so that when the piston 82 is moved into the relief chamber 93, a large fluid flow passage is provided between the piston and the housing. This permits the mandrel to "jump" or make a sudden movement downwardly at a terminal portion of its downward travel, causing the collar 38 to strike and engage the upper housing 32 sending a shock wave to the surface through the string of pipe to give a surface indication that the index pin 41 is within the slot E.

On the other hand, when the mandrel is moved upwardly relative to the housing, the fluid above the piston 82 will move the piston downwardly relative to the mandrel to compress the spring 89. The inner wall of the piston is provided with longitudinal grooves 94 which permit the fluid to bypass between the piston 82 and the mandrel 28 so that the mandrel can be picked up relative to the housing relatively fast as compared to the downward movement of the mandrel.

Below the hydraulic delay system, the housing has a bore portion (FIG. 4B) which slidably and sealingly receives the lower end of the mandrel. The housing bore portion is recessed to provide an annular trap or sample chamber 42 between the housing 29 and mandrel 28. A flow port 96 is provided in the bore portion above the recess 42 and extends between the wall of the bore portion and an annular cavity 97 in communication with the recess. Below the recess in the bore portion, the bore portion is similarly provided with a flow port 98 extending between the wall of the bore and an annular cavity 99 in the end of the housing.

The mandrel has spaced sealing elements 95 disposed to either side of a recessed portion 101, the sealing elements being arranged to seal the mandrel 28 relative to the bore above each of the housing flow ports 96, 98. The mandrel 28 also has a flow port 44 disposed above the upper seal and above the plug 71. When the mandrel is moved downwardly relative to the housing, the mandrel recess 101 between the mandrel sealing elements places the lower flow port 98 in communication with the sample chamber 42 and the upper flow port 96 in communication with the mandrel port 44.

The bypass section 23 (FIGS. 1–3), which is suspended below the tester section 22, has a mandrel 31 that is threadedly secured to the bottom of the tester housing 9. A bypass housing 51 has bypass ports 52 formed therein. Seals 50 which are positioned on the bypass mandrel serve to seal off the bypass ports 52 when the bypass mandrel is in a down position as shown in FIGS. 2 and 3. Upward movement on the bypass mandrel will position the lower seal 50 above the port 52 to provide fluid communication from the interior of the bypass section to the annular space in the well bore. A packer 6 which is positioned below the bypass 23 may depend for its expanded condition upon the bypass valve or port 2 being closed to prevent hydrostatic pressure in the well bore from entering the interior of the bypass housing. Therefore, the maintenance of the bypass in a closed position is important and will be explained.

The bypass is maintained in its closed position by the action of fluid forces on exposed areas of the tester and bypass members. After the bypass is closed, the forces which act down on the tester housing and bypass mandrel, are maintained greater than the forces acting up on the tester housing and bypass mandrel. The forces acting down can be calculated by multiplying the hydrostatic pressure in the well bore $P_h$ times the difference between the area of the tester housing and the area of the tester mandrel $(A_1-A_2)$ (see FIG. 2). The forces acting up in the system may be calculated by multiplying the hydrostatic pressure $P_h$ times the area of the tester housing minus the area of the bypass mandrel $(A_1-A_3)$, plus the formation pressures $P_f$ times the area of the bypass mandrel minus the area of the tester mandrel $(A_3-A_2)$. The latter calculation, $(A_3-A_2)$ represents the effective area of the tool subjected to formation pressures which is in effect the difference in areas between the top and bottom of the bypass mandrel that is exposed to formation fluid. Therefore, the total force down $F_d$ may be calculated by subtracting the forces up from the forces down as shown in the following equation:

$$F_d = P_h(A_1-A_2) - P_h(A_1-A_3) - P_f(A_3-A_2) \quad (1)$$
$$F_d = P_h(A_3-A_2) - P_f(A_3-A_2) \quad (2)$$
$$F_d = (P_h - P_f)(A_3-A_2) \quad (3)$$

Therefore, if the hydrostatic pressure in the well bore is maintained greater than the formation pressure, the forces acting on the tester and bypass after closure of the bypass valve will serve to maintain the bypass valve in a closed position.

In order to open the bypass, an upward acting force must be applied to the tester housing and bypass mandrel which will overcome the predominant downward forces. This is accomplished by applying lifting force on the tubing string which is sufficient to shift the balance of forces in an upward direction.

It may be appreciated from the foregoing discussion of this bypass system that longitudinal upward and downward movements of the tubing string to manipulate the multiple test section would not open the bypass but rather an upward force calculated to shift the balance of forces must be applied to the bypass mandrel to open the bypass.

Figures 6, 6A, 7:
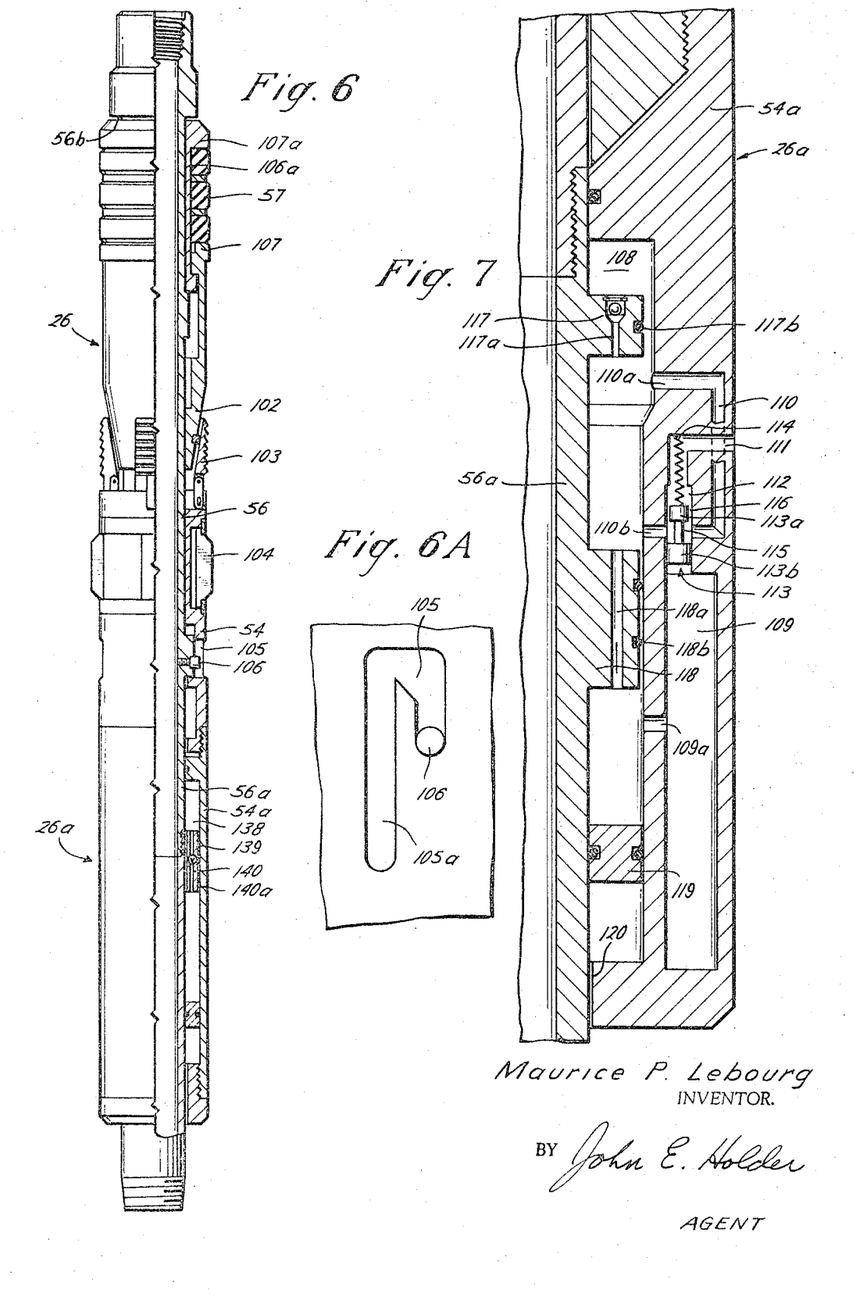
FIG. 6 is a detailed vertical section of a packer locking tool.
FIG. 6A is a developed view of a J slot used in the packer as viewed from the outside of the packer.
FIG. 7 is a partial section of another packer locking tool.

FIGS. 6 and 7 show preferred embodiments of a packer and packer lock system which may be used in conjunction with the tester and bypass sections heretofore described. Referring first to FIG. 6 a packer section 26 is shown threadably connected at its lower end to a subsection 26a which incorporates a safety lock system.

The packer generally comprises a tubular housing assembly 54 extending substantially the full length of the device. A tubular mandrel assembly 56 is received therein for longitudinal and rotational movement relative to the housing. The mandrel assembly extends completely through the housing assembly and projects upwardly of the upper end of the housing assembly. The housing assembly includes an expander or wedge portion 102 and slips 103 which are pivotally positioned on the housing adjacent and overlying the wedge portion 102, the wedge being movable relative to the slips. The upper end of the wedge portion 102 has an annular flange or shoulder 107 formed thereon. A tubular friction pad member 104 is positioned on the housing and cooperatively receives therein an index pin 106 positioned on the mandrel. FIG. 6a shows a developed view of the J slot as viewed from the outside of the packer.

The mandrel assembly includes an annular recess formed near its upper end. A sleeve portion 106a is positioned in the annular recess and has an upper shoulder 107a which is aligned with and spaced from the shoulder 107 formed on the wedge portion of the housing assembly. Elastomer packing means 57 is positioned in the space between the shoulder 107a on the sleeve and shoulder 107 on the wedge portion of the housing.

The safety lock sub-section 26a which is shown secured to the bottom end of the packer in FIG. 6 is but one embodiment of the safety lock section. FIG. 7 also shows a safety lock sub-section for attachment to the bottom end of the packer. This embodiment which will be described first, includes a tubular housing 54a and a mandrel 56a received within the housing, each of which are respectively secured to the housing and mandrel of the packer section. The housing section includes an annular recess portion 108 forming a chamber or cylinder between the housing and mandrel, and a reference pressure chamber 109 which is formed in the housing between the cylinder 108 and the outer housing wall. A passageway 110 is formed in the housing to connect an upper and lower port 110a and 110b in the cylinder 108 thereby forming a cylinder bypass. A pressure port 111 which is formed through the outer housing wall communicates with a valve cylinder 112 extending between the pressure port 111 and the reference pressure chamber 109. The valve cylinder 112 intersects the cylinder bypass passageway 110 and a spool piston 113 which is received in the valve cylinder 112 is movable between two positions, one of which seals off the cylinder bypass passageway 110. A spring 114 is positioned in the valve cylinder 112 above the spool piston 113 to normally urge the piston into a position in which the cylinder bypass passageway 110 is open as shown in FIG. 7 to provide fluid communication between the ports 110a and 110b through the passageway. This opening and closing of the passageway is provided by upper and lower heads 113a and 113b on the piston, connected by connecting rod 115 of smaller diameter than the heads. When the connecting rod is positioned in the intersection of the valve cylinder 112 and the cylinder bypass 110 as shown in FIG. 7, the cylinder bypass is opened to fluid communication between its terminating ends 110a and 110b in the cylinder 108. However, when one of the heads on the spool piston is positioned in the intersection, the cylinder bypass is closed to fluid communication. A restricted orifice 116 is formed in the upper piston head 113a to permit a slow leakage of fluid around the piston head.

The safety lock mandrel 56a includes an upper piston 117 which is formed annularly on the outer wall of the mandrel and which is received within the annular cylinder 108 formed between the housing and the mandrel. A passageway 117a is formed through the upper piston and a check valve is positioned in the passageway to permit the passage of fluid upwardly through the passageway while restricting the passage of fluid downwardly through the passageway. A seal 117b is formed on the peripheral wall of the piston. A lower annular piston 118 is positioned on the mandrel below the upper piston 117 and likewise has a passageway 118a extending therethrough and a seal 118b positioned thereon. The cylinder 108 is filled with a fluid, and a floating compensation piston 119 having a seal member is positioned at the lower end of the annular cylinder 108 to seal the fluid in the cylinder. The space in the cylinder below the compensating piston communicates with and maintains the pressure of the outside of the housing through a port 120 on the lower end of the housing member.

This hydrostatic fluid pressure is transferred through the compensating piston 119 to the reference chamber 109 through a port 109a between the reference chamber and the annular cylinder 108, thereby maintaining fluids in chamber 109 at that pressure.

In positioning the tool and packer section in the well bore, movement between the packer mandrel and housing is prevented by the position of the index pin 106 projecting from the packer mandrel into the J slot 105 formed in the packer housing, as shown in FIG. 6a, thereby causing the friction pads 104, which are formed on the packer housing, to move downwardly in the well bore as a downward force is applied to the packer mandrel. Upon reaching the position of the well bore to be packed off, an upward movement on the packer mandrel and subsequent rotation to the right will index the pin in the J slot to position the pin in the long part of the slot 105a and free the packer mandrel for longitudinal movement relative to the packer housing which is restrained from movement due to the friction pads engaging the well bore. Thereafter, downward movement on the packer mandrel causes a shoulder 56b formed on the packer mandrel to abut against the top of shoulder 107a formed on the sleeve 106a positioned between the packer mandrel and housing. Downward force applied to the sleeve 106a through the mandrel is transmitted through the elastomer packer element 57 to the shoulder 107 formed on the upper end of the wedge portion 102. The wedge portion slides under the slips 103 and wedges the pivoted slips outwardly against the borehole wall thereby retarding further downward movement of the wedge 102 and flange 107 formed on the upper end of the wedge. Thereafter further downward movement on the flange 107a formed on the upper end of the sleeve, by downward movement of the packer mandrel, causes the shoulder 107a to move downward relative to the now stationary shoulder 107 on the wedge thereby causing the elastomer packing element 57 to compress and expand outwardly into engagement with the wall of the well bore.

These same movements which have taken place with respect to the packer mandrel and housing have also been transmitted to the mandrel and housing of the safety lock sub-section 26a positioned below the packer. Upon retardation of movement of the housing section and further downward movement of the mandrel when setting the packer, as described above, the safety lock mandrel also moves downwardly positioning the upper and lower pistons 117, 118 downwardly in the annular cylinder 108. The lower piston 118 is positioned over a port 109a which is formed between the reference pressure chamber 109 and the cylinder 108 to seal off fluid communication between the chamber and the cylinder thereby locking a reference pressure in the chamber 109. At the same time the upper piston 117 is moved into a position between the terminal ends 110a and 110b of the cylinder bypass passageway 110. Movement of the upper piston 117 downwardly into a close fitting annular portion in the cylinder between the cylinder bypass terminal ends 110a and 110b is permitted due to the transfer of fluids in the cylinder through the orifices 117a, 118a in the upper and lower pistons, the orifice in the upper piston having a check valve which permits fluid flow upwardly through the piston. When the upper piston 117 is positioned between the cylinder bypass terminal ends 110a and 110b, the elastomer packing element 57 on the packer has become fully expanded in the well bore and further downward movement of the mandrel is prevented, the packer now being set.

Thereafter, the tester valve in the test section of the tool is opened exposing the pressure port 111 and cylinder 112 to formation pressures. The fluid which is now trapped in the reference pressure chamber 109 due to the closing of the port 109a by the lower piston 118 attempts to expand to the formation pressure in cylinder 112 thereby moving the lower head 113b of the spool piston upwardly to close the intersection of the cylinder 112 and passageway 110, thereby isolating the portions of the cylinder 108 in communication with ports 110a and 110b above and below the upper piston 117. Thereafter an upward force on the mandrel attempting to move the upper cylinder 117 back to its position shown in FIG. 7 is restrained by the fluid trapped above the piston, the fluid being unable to travel from above to below the piston 117 through the check valve in the orifice 117a. The packer mandrel and housing are now locked from relative movement between the mandrel and housing thereby locking the packer element 57 in the expanded position.

The pressure port 111 is again exposed to hydrostatic pressure by the opening of the bypass valve 52 in the bypass section 23 as shown in FIG. 1. The reference pressure in chamber 109 being equal to the hydrostatic pressures, the spring 114 forces the spool piston 113 to move downwardly thereby opening the cylinder bypass 110, and permitting fluids to bypass around the upper piston 117. This permits relative movement between the packer mandrel and the packer housing to permit contraction of the elastomer packing element.

An alternative safety lock system is shown included in a sub-section secured to the bottom of the packer in FIG. 6. The safety lock systems shown in FIGS. 6 and 7 may also be formed as an integral part of the packer section itself. The packer section operates in the same manner as set forth above in describing the operation of the safety lock embodiment in FIG. 7. To form the packer lock, an annular chamber 138 is formed in the housing wall, and a piston 139 is formed on the outer wall of the mandrel and positioned within the cylinder 138. An orifice 140 is formed in the piston permitting communication of fluid above and below the piston in the cylinder, however, a check valve positioned in the orifice permits the flow of fluids from above the piston to below the piston but does not permit the flow of fluids through the orifice in the reverse direction. The piston is sized to provide a restricted annular orifice 140a around the periphery of the piston between the piston and the cylinder to permit a slow leakage of fluid around the piston. In the operation of this embodiment of the safety lock system, downward movement on the packer mandrel relative to the housing to set the packer causes fluids to flow from the lower part of the cylinder below the piston 139 to the upper part of the cylinder through the orifice 140 and check valve. Once the packer is set, however, upward movement of the mandrel with respect to the housing is prevented because the check valve will not permit the flow of fluids from the upper part of the cylinder to the lower part of the cylinder. In order to free the packer, an upward tension is applied to the packer mandrel which will cause fluids to slowly leak around the restricted orifice 140a from the upper part of the cylinder to the lower part of the cylinder thereby eventually permitting movement of the packer mandrel upwardly relative to the packer housing to permit contraction of the elastomer packing element.

In FIG. 8 an alternative embodiment of the bypass section 23 of the tool is illustrated. This bypass section 23 includes a tubular mandrel 31 telescopically received within a tubular housing 51, the mandrel and housing respectively being adapted for coupling in the string of tools 20. A spline 121 on the upper part of the mandrel cooperates with a spline groove 122 in the bypass housing permitting relative reciprocation but preventing relative rotation therebetween. The spline 121 engages a flange 123 on the housing in an expanded position of the bypass section while a shoulder 124 on the mandrel engages the housing flange 123 in a contracted position. Intermediate of the housing is a bore portion 126 forming a cylinder which slidably receives a tubular sleeve piston 127 slidably mounted for limited longitudinal movement between a bypass flange 128 and seat flange 129 on the mandrel. The sleeve piston 127 has a slightly smaller diameter than the diameter of the cylinder bore thereby forming a restricted orifice 131. The ends of the cylinder or annular chamber 126 formed between the mandrel and housing are closed by a pair of floating, compensation pistons 132, 133 which enclose a fluid within the chamber. When the mandrel 31 is moved downwardly relative to the housing 51, the fluid in the chamber moves the sleeve piston 127 upwardly and longitudinally-extending grooves 134 in the interior of the sleeve as well as passageways 136 in the bypass flange permit fluid to easily bypass the sleeve piston 127 and permit the bypass section to be rapidly moved to a contracted position. However, when the mandrel 31 is moved upwardly relative to the housing 51 to an expanded position, the fluid above the piston 127 causes the piston to seat on the flange 129 and fluid is metered through the restricted orifice 131 between the sleeve piston and cylinder bore. Hence, the mandrel movement upwardly relative to the housing is delayed and retarded.

The lower end of the housing has a bypass port 52 while the lower end of the mandrel has a sealing element 137 so that, in the contracted position of the mandrel and housing, the bypass port is closed by the sealing element 137 and the floating piston seal 133.

Figure 9:
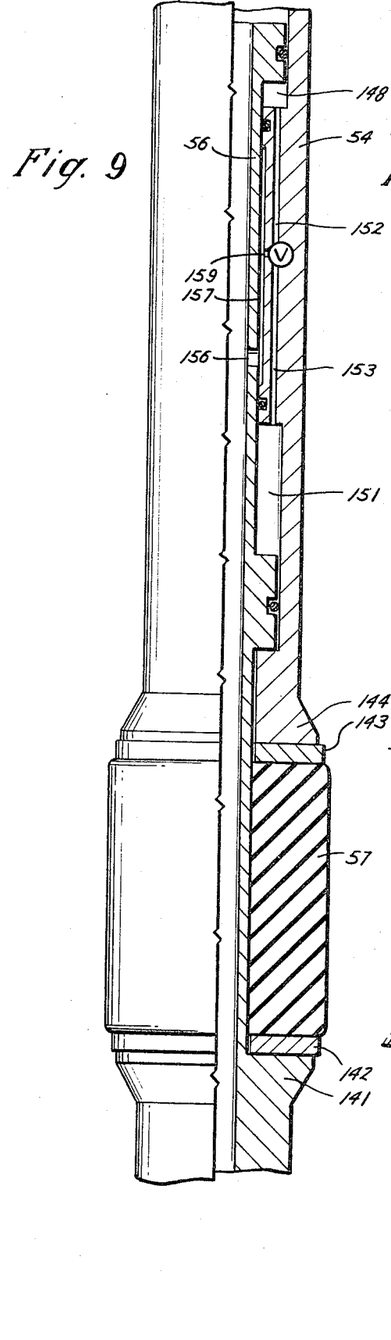
FIGS. 9 and 10 are detailed vertical sections of an alternative packer locking tool.
Figure 10:
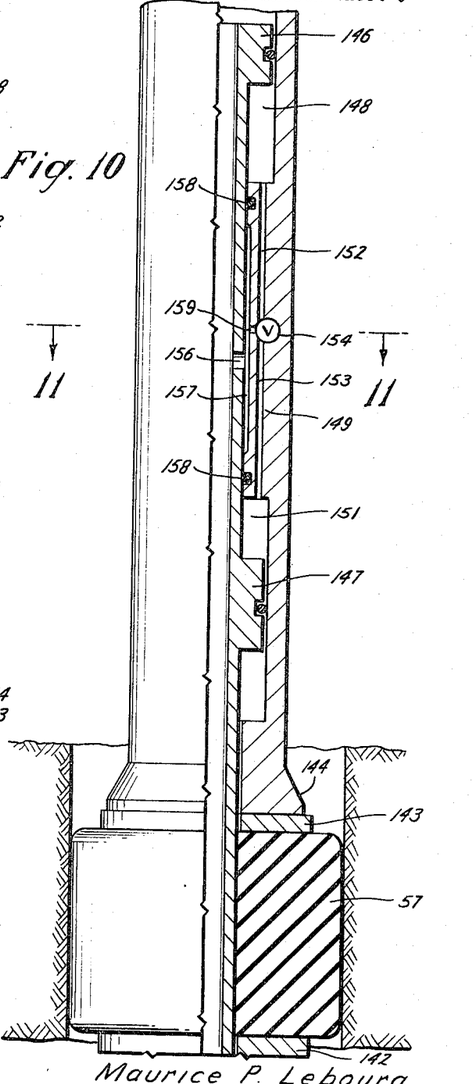

One embodiment of the packer assembly is shown in FIGS. 9–11. The packer assembly 26 includes a telescopically-mounted mandrel 56 and housing 54 which are respectively arranged for coupling to the tool sections above and below the assembly. At the lower end of the mandrel is a flange 141 and an annular back-up plate 142. An annular elastomer packing element 57 is received on the mandrel between the lower back-up plate and an upper back-up plate 143. The housing has a flange 144 abutting the upper back-up plate. It will be appreciated that if the housing 54 is moved downwardly relative to the mandrel 56, the packing element 57 can be expanded to engage the wall of the well bore as shown in FIG. 8.

In the upper part of the mandrel and housing is a system for releasably retaining the packer element in an expanded condition. For this system the mandrel has upper 146 and lower 147 flanged portions slidably and sealingly received in the housing and forming a recess or chamber 148, 151 therebetween, the chamber being filled with a hydraulic fluid. The housing has an inwardly-extending piston 149 which is slidably received in the chamber and forms upper 148 and lower 151 recess portions. Upper 152 and lower 153 passageways extend longitudinally through the piston to a valve 154. It will be appreciated that if the valve is opened in the position shown in FIG. 9, connecting the upper 152 and lower 153 passageways to one another, fluid will pass from the lower recess portion 151 to the upper recess portion 148 when the housing 54 is moved downwardly relative to the mandrel 56 to the position shown in FIG. 10 with the packer element 57 expanded, closing of the valve 154 and taking the upper 152 and lower 153 passageways out of communication will trap fluid in the upper recess portion 148 and prevent the housing from moving upwardly relative to the mandrel.

The valve system includes a port 156 in the mandrel 56 opening to a recessed portion 157 of the piston between spaced seals 158 and a control port in the piston opening to the valve 154. As shown in FIG. 11, the valve includes a sleeve 161 retained in a bore 162 of the housing, the sleeve 161 having a first annular groove 164 and ports in communication with a first passage 163 and a second annular groove and ports 167 in communication with a second passageway 166. It will be appreciated that FIG. 11 illustrates both upper 152 and lower 153 passageways for convenience of understanding although one of the passageways would not be seen in the section view. The illustration also demonstrates that the upper and lower passageways are offset relative to one another at their access points to the valve.

The bore of the sleeve 171 opens at one end to the exterior of the tool and at the other end to the control port 159. Received in the sleeve bore is a spool type piston 172 arranged for movement between a position placing the upper and lower passageways 152, 153 in communication and a position where the upper and lower passageways are isolated from one another. A spring 173 is provided to normally urge the piston to a position placing the passageways in fluid communication with one another. The piston in the position illustrated has a first portion 174 closing off the ports 163, 166 leading to passageways 152, 153, the first portion, however, having a slightly smaller diameter than the bore of the sleeve permitting some fluid leakage to occur. When fluid pressure exterior of the housing is greater than fluid pressure at the control port 159 (which is connected by the piston recess 157 and mandrel port 156 to the interior of the mandrel) and the force of the spring 173, the piston 172 will assume the illustrated position where the first portion 174 of the piston isolates the first 163 and second 166 passageways from one another. When the fluid pressure exterior of the housing is less than the fluid pressure at the control port 159 and the force of the spring 173, the piston is shifted so that a recessed portion 176 of the piston places passageways 163, 166 in communication with one another.

The fluid leakage mentioned above is for the purpose of obtaining release of the valve eventually should a malfunction occur. Thus, the packer is never irretrievably set in the well bore.

The differential pressures to control the spool valve are obtained in a manner which will hereinafter be more fully explained.

The operation of the apparatus of FIGS. 4–11 may best be understood by use of the following table in connection with the description following.

| | Condition 1<br>Going in | Condition 2<br>Setting packer | Condition 3<br>Open tester | Condition 4<br>Close tester |
|---|---|---|---|---|
| Tester section | Expanded | Expanded, slowly moving to contracted. | Contracted | Expanded to intermediate position. |
| Index position | A | A toward C | C to E | E to G to H. |
| Shoulder 38 and housing 29 | Not engaged | Not engaged | Engaged | Not engaged. |
| Splines 36, 37 | do | Moving to meshing relationship. | Not engaged | Engaged. |
| Test port 44 | Closed | Closed | Open | Closed. |
| Sample chamber 42 | do | do | do | Do. |
| Bypass section 23 | Expanded | Contracted | Contracted | Contracted. |
| Port 52 | Open | Closed | Closed | Closed. |
| Packer assembly 26 | Expanded | Contracted | Contracted | Contracted. |
| Packer element 57 | Contracted | Expanded | Expanded | Expanded. |
| Passageway 110 or valve 154 | Open | Open | Closed | Closed. |

CONDITION 1

In going in the well bore, the various elements and tool parts are in the condition above noted. In the packer assembly the passageway 110 is open to provide movement of the packer members. Likewise, the valve 154 in the alternative embodiment shown in FIG. 11 is open because the pressure of the fluids within the packer mandrel 56 are the same as the pressure of the fluids on the exterior of the tool so that the spring 173 places the spool piston 172 in a position where the upper and lower passageways 152, 153 are in fluid communication.

The bypass 23 is held in an expanded position by the weight of the tool attached to the bypass housing 51 so that the bypass port 52 is open and fluid can pass through the packer mandrel 56 and return to the well bore via the bypass port 52.

In the testing section, the sample chamber 42 and test ports are closed while the index pin is disposed in pocket A.

CONDITION 2

Upon reaching the level of the test, the packer element 57 is expanded. This occurs in the packer shown in FIG. 6 because the packer housing 54 becomes fixed relative to the well bore due to the action of the friction pad and slips engaging the casing. In the packer shown in FIGS. 2, 9 and 10, the packer mandrel becomes fixed due to the bottoming of the perforated anchor 27 or by setting a hook wall anchor not shown. It should be noted that for use of the packer in FIGS. 6 and 7 the conventional J slot control can be operated because all of the sections are spline connected to permit rotation.

As stated heretofore, one of the packer elements becomes fixed in the well bore and a downward motion on the string of pipe is transmitted through the tool sections to provide relative movement between the packer housing and the packer mandrel and consequently expand the packer element 57. As the packer element expands, the bypass section 23 contracts to close the bypass port 52. In the tester section the fluid in the delay system is trapped above the piston 82 and very slowly meters through the restricted orifice 92. At this time, the index pin is moving from pocket A toward pocket E and rotating the upper housing 32 to place the splines 36, 37 in meshing relationship to one another. Well before the tester section becomes contracted the packer is fully expanded and the bypass is closed.

CONDITION 3

After the packer is fully expanded, the delay piston 82 in the tester section reaches the recessed portion 93 and very quickly permits the tester mandrel and housing to contract and very quickly opens the mandrel test port 44 and sampling chamber 42 to the bore of the well tool which extends down to the perforated anchor 27 below the expanded packer. This quick motion is apparent at the earth's surface and gives an indication to the operation that the tool is properly operating. Because the interior of the string of pipe and the formation pressures are considerably less than hydrostatic pressure of the well fluid trapped in the reference chamber 109, the valve passageways 110 in the packer is closed trapping fluid above the piston 117 to lock the packer members from relative movement. At this time, the tester mandrel shoulder 38 engages the upper housing 32, the bypass mandrel forceably engages the bypass housing 51 and downward pressure on the string of pipe can be continuously maintained on the packer element to ensure that it will remain expanded. During this condition, the index pin has traveled from position C into the slot E.

CONDITION 4

After fluid has flowed for a sufficient period of time, say fifteen minutes, the tester is closed for say five minutes to obtain a shut-in pressure. To close the tester the string of pipe is picked up a sufficient distance to index the pin from the upper pocket E to the lower pocket G and then set down to index the pin to the intermediate pocket H.

In picking up the string of pipe, the delay valve in the tester opens to permit quick bypass of fluid and movement of the tester section to the expanded condition. At the same time, the differential pressure forces on the bypass retard movement of the bypass to an expanded position and the closed passageway 110 in the packer assembly prevents release of the expanded packer element 57. The splines 36, 37 in the tester section are meshed once again and the mandrel spline 36 disposed above the housing spline 37. Thus, when the string of pipe is set down and the index pin goes to the intermediate pocket, the splines are brought into abutment and direct force on the string of pipe is once again directly transmitted to the packer assembly to positively hold the packer element expanded to close off the formation while the pressure of the formation fluids is measured.

When the tester is closed a fluid sample is trapped in the sample chamber 42. If it is desired to retrieve the well tool, picking up of the drill pipe moves the index pin from pocket H to pocket A.

On the other hand, it is desirable to repeat the above sequence of operations a number of times which permits the formation fluids to eventually flush out the filtrate and a true recovery from the formations to be obtained.

To determine when the fluid recovery is formation fluids, a gas flowmeter 19 (FIG. 3) is connected to the string of pipe at the surface. As fluids enter the string of pipe the displacement of air in the pipe is indicated by the flowmeter. At a point where the formation fluid flow stabilizes the gas flow becomes constant indicating completion of the test.

TOOL RETRIEVAL

In order to retrieve the tool string 70 and the fluid sample trapped in the chamber 42, the packer element 57 must be contracted to release the tools from the well bore. This step may be accomplished by picking up on the tool string to close the tester valve and trap a fluid sample at formation pressure. Thereafter, the bypass mandrel 31 is lifted up relative to the bypass housing 51. A sufficient lifting force on the mandrel 31 will shift the differential forces maintaining the bypass closed and cause the bypass port 52 to open. The opening of port 52 subjects the inner bore of the tool sections to the hydrostatic pressure of the well fluids thereby increasing the inner bore pressure and consequently communicating the increased pressure with the port 111 of the packer. This pressure in turn acts with spring 114 to move the piston 113 downward and open the passageway 110 to connect the upper and lower ports 110a and 110b above and below the piston 117. The valve opening permits expanding movement of the packer mandrel and housing to release the packer element 57 from compression and engagement with the well bore.

Further upward movement of the tubing string will withdraw the tool string from the well bore.

If the tool string should become lodged in the well bore below the safety joint, the tubing string may be rotated above the joint to release the upper part of the string for retrieval to the surface. In order to affect the loosening of the threads in the safety joint, it may be necessary to lower an explosive element or string shot into the full open bore of the tool string to the level of the safety joint whereupon the shot is detonated to loosen the joint for subsequent unthreading by rotation of the tubing string. The knock-out plug 71 which serves the purpose of blocking the tester section mandrel bore 43 during flow testing of the well may be removed by dropping an object in the bore of the tubing string which object serves to shear the pin 72 to knock out the plug 71. This opens the bore for lowering of the string shot to the safety joint section 24.

After retrieving the tool to the surface, it is necessary to analyze the sample trapped in the chamber 42 at the conditions under which it was trapped. To effect this purpose, a plug 100 is threadably received in the wall of the lower tester housing 33 (FIG. 6B). Manipulation of the tester members will permit sealing off of this plug port for removal of the plug and insertion of test instruments while maintaining the sample at reservoir conditions. Subsequently, the tester mandrel is moved to uncover the plug port and place the instruments in communication with the sample chamber for analysis of the trapped fluid.

Figure 12:
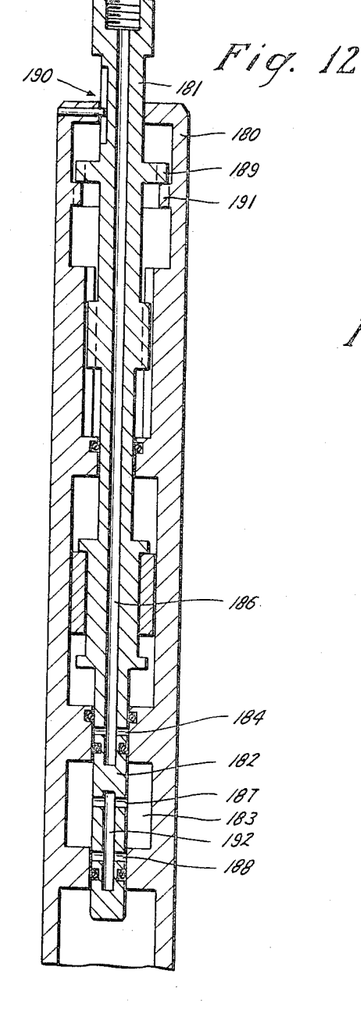
FIG. 12 is a schematic view of an alternative embodiment of the tester shown in FIGS. 4A and 4B.
Figure 13:
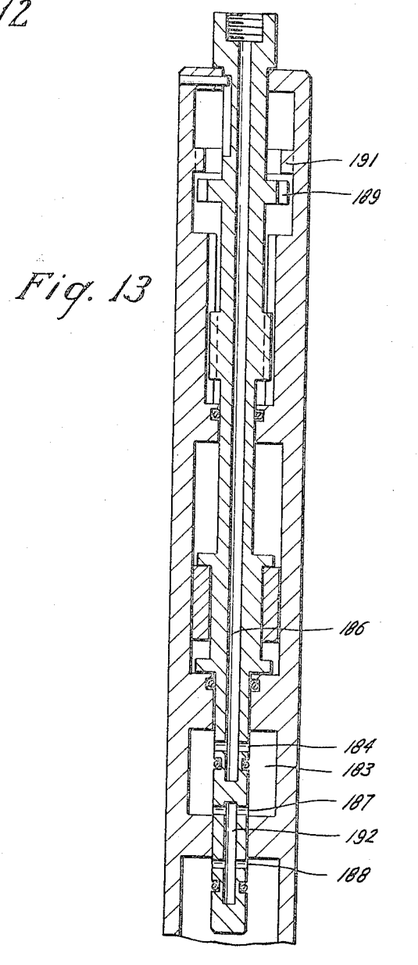
FIG. 13 is a schematic view of the alternative tester in the flowing condition.

The applicant has set forth a preferred embodiment of the apparatus to perform the multiple tests and sampling operation. There are many forms of apparatus which could be utilized to perform this method of operation, one such alternative embodiment of a tester section of the tool is shown in FIGS. 12 and 13. These schematic views show a tool with an indexing system, splines, hydraulic delay similar to that previously described. Mandrel 181, however, is further provided with a closed bore portion 182 having spaced ports disposed above the lower seal in the lower bore of the sample chamber 183. Hence, as shown in FIG. 12, the test port 184 connecting the sampling chamber 183 with the mandrel bore 186 of the tool string is closed as are the ports in the mandrel. As shown in FIG. 13, the alignment of mandrel splines 189 and housing splines 191 by an index slot mechanism 190 permits downward movement of the tester mandrel 181 with respect to the housing 180 thereby positioning the test port 184 and the upper mandrel port 187 in communication with the sample chamber 183 and the lower port 188 connecting the closed mandrel bore 192 to the sample chamber 183. When these three ports are positioned as shown in FIG. 13, a fluid communication is provided from the formation being tested to the well surface by tracing a flow through the lower housing into the lower mandrel bore 192 through port 188, into the sample chamber 183 through port 187, and into the upper bore 186 of the mandrel through port 184 for communication to the well surface through the bore of the tubing string.

Different well testing apparatus is usually designed for use in open and cased well bores. While this invention is primarily directed to apparatus for testing open well bores it will be appreciated that features of the present invention can have application for testing apparatus for cased well bores.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A method for testing earth formations in a well bore with a well tool including a valved formation tester, packer, and pressure measuring device, comprising the steps of:
   suspending at a desired position in a well bore a well tool including telescopically mounted parts arranged for relative longitudinal movement, the parts having a fluid filled chamber between them and a packer element ordinarily expanded and contracted by relative reciprocal motion of the parts of the well tool,
   trapping fluid in a portion of the fluid chamber between the parts to retain the relative position of the parts when the packer is expanded,
   opening the valved tester to the flow of formation fluids,
   closing the valved tester to the flow of formation fluids and measuring shut-in pressure,
   opening and closing the valved tester to test the formation pressure until such formation pressure has stabilized,
   closing the test valve to trap a formation fluid sample, and
   releasing the trapped fluid between the parts of the packer to permit relative movement of the parts and thereby to permit removal of the well tool from the well bore.

2. A method of testing earth formations and sampling formation fluids at formation conditions comprising the steps of:
   suspending in a well bore on a string of pipe a valved well tool and expandable packer,
   expanding the packer to isolate a section of the earth formations,
   cyclically operating the valved well tool more than once by opening and closing the valved tool to flow formation fluids therethrough for passage into the string of pipe,
   recording the pressure of the formation fluids while the valved well tool is cyclically operated,
   trapping a sample of the formation fluid at formation pressure within the well tool during the last cycle of operating the well tool and prior to release of the packer,
   releasing said packer to retract it, and
   retrieving the packer and well tool to the surface to inspect the formation fluid trapped within the well tool.

3. A well tool for testing earth formations traversed by a well bore,
   said well tool being adapted for coupling in a string of pipe and comprising:
   first and second members telescopically arranged for movement relative to one another between longitudinally spaced positions,
   each of said members having a fluid passageway,
   means forming an enclosed sampling chamber between said members, and
   valve means between said members operative in one of said spaced positions for placing said passageways in fluid communication with said sampling chamber whereby fluids can flow from one of said passageways to the other through said sampling chamber and operative in another of said spaced positions for isolating said sampling chamber from said passageways whereby a flowing sample of fluids in said sampling chamber can be trapped and confined.

4. A well tool for use in a well bore comprising:
   inner and outer members telescopically arranged for movement between expanded and contracted positions,
   means for limiting relative movement between said members in said expanded and contracted positions,
   one of said members in said expanded position having a recessed portion disposed adjacent to longitudinally extending first fluid communication means on said other member,
   upper and lower sealing means between said members above and below said recessed portion and said fluid communication means serving to form an enclosed chamber, and
   a second fluid communication means in said other member and disposed above said upper seal means and a third fluid communication means in said one member and disposed below said lower seal means,
   whereby in said contracted position said second fluid communication means and recessed portion are in fluid communication while said first and third fluid communication means are in fluid communication.

5. A well tool comprising:
   inner and outer telescopically mounted members arranged for movement between first and second longitudinally spaced positions,
   said outer member having a bore portion with a first recess forming chamber, and an upper entry port in said bore portion in fluid communication with said sample chamber,
   said inner member having a closed bore to provide a passageway in said inner member,
   said outer member having a lower entry port in said bore portion in fluid communication with the lower part of said outer member,
   said inner tubular member having a test port in fluid communication with said passageway, a longitudinally extending second recess in its outer wall below said test port, and sealing means disposed above and below said recess, said second recess placing said first recess and said lower entry port in fluid communication and placing the upper entry ports in fluid communication with said test port in a first position of said members, said first recess and sealing means being arranged to isolate said test port and lower entry port from fluid communication to said sample chamber in a second position of said members.

6. Packer means including tubular, telescopically arranged members,
   a packer element disposed between portions of said members and operative upon relative movement of said members to move between expanded and contracted positions,
   said members having a fluid chamber formed therebetween for receiving fluid,
   one of said members having a portion forming a piston in said chamber,
   a bypass in said piston for passing fluid through said piston,
   means in said bypass for preventing fluid flow through said piston in one direction while permitting fluid flow in the other direction, and
   a restricted orifice formed on one of said members for permitting a slow leak of fluid around said piston.

7. A well tool including tubular, telescopically arranged members,
   means forming a sealed fluid chamber between said members for receiving fluid,
   one of said members having a piston received in said chamber and movable between spaced positions, and
   means in said other member forming a bypass for passing fluid and permitting movement of said piston between said positions,
   said bypass including valve means for closing said bypass in one of said positions thereby trapping fluid between said piston and part of said chamber to hold said members against relative movement in at least one direction, 8. A well tool including tubular, telescopically arranged members,
   means forming a sealed fluid chamber between said members for receiving fluid,
   one of said members having a piston received in said chamber and movable between spaced positions, and
   means in said other member forming a bypass for passing fluid and permitting movement of said piston between said positions,
   said bypass including valve means for closing said bypass in one of said positions thereby trapping fluid between said piston and part of said chamber to hold said members against relative movement in at least one direction,
   said valve means including a valve element responsive to pressure for controlling the operation of said valve means.

9. A well tool including tubular, telescopically arranged members,
   a packer element disposed between portions of said members and operative upon relative movement of said members to move between expanded and contracted positions,
   means forming a sealed fluid chamber between said members for receiving fluid,
   one of said members having a piston received in said chamber and movable between spaced positions, and
   means in said other member forming a bypass for passing fluid and permitting movement of said piston between said positions,
   said bypass including valve means for closing said bypass in one of said positions thereby trapping fluid between said piston and part of said chamber to hold said members against relative movement in at least one direction.

10. A well tool including tubular, telescopically arranged members,
    means forming a sealed fluid chamber between said members for receiving fluid,
    one of said members having a piston received in said chamber and movable between spaced positions,
    means in said other member forming a bypass for passing fluid and permitting movement of said piston between said positions,
    said bypass including valve means for closing said bypass in one of said positions thereby trapping fluid between said piston and part of said chamber to hold said members against relative movement in at least one direction,
    said valve means including a valve element responsive to pressure for controlling the operation of said valve means,
    a reference pressure chamber formed in one of said members,
    means for selectively trapping a fluid under pressure in said pressure chamber, and
    means placing said valve element in fluid communication with said pressure chamber.

11. A well tool including tubular, telescopically arranged members,
    a packer element disposed between portions of said members and operative upon relative movement of said members to move between expanded and contracted positions,
    means forming a sealed fluid chamber between said members for receiving fluid,
    one of said members having a piston received in said chamber and movable between spaced positions,
    means in said other member forming a bypass for passing fluid and permitting movement of said piston between said positions,
    said bypass including valve means for closing said bypass in one of said positions thereby trapping fluid between said piston and part of said chamber to hold said members against relative movement in at least one direction,
    said valve means including a valve element responsive to pressure for controlling the operation of said valve means,
    a reference pressure chamber formed in one of said members,
    means for selectively trapping a fluid under pressure in said pressure chamber,
    and means placing said valve element in fluid communication with said pressure chamber.

12. An apparatus for use in a well bore containing a well fluid,
    said apparatus including tubular, telescopically arranged members,
    one of said members having a recess therein and sealing means near each end of the recess thereby forming a sealed chamber between said members for receiving a fluid,
    the other member having a piston sealing received in said recess,
    bypass means in one of said members for passing fluid around said piston, and valve means in said bypass means selectively actuatable in response to differential pressures for controlling the flow of said fluids passing around said piston.

13. An apparatus for use in a well bore containing a well fluid,
    said apparatus including tubular, telescopically arranged members, one of said members having a recess therein and sealing means near each end of the recess thereby forming a sealed chamber between said members for receiving a fluid, the other member having upper and lower members sealingly received in said recess, bypass means in one of said members for passing fluid around said upper member, a reference pressure chamber formed in one of said members, a port connecting said reference chamber and said sealed chamber adapted to be closed or opened by said lower member, valve means in said bypass means for opening and closing said bypass means, said valve means having a valve control element in fluid communication with the reference pressure chamber and another portion in fluid communication with the outside of said telescopically arranged members, said valve control element being controlled by pressures in said pressure chamber and outside of said members to open and close said bypass means.

14. An apparatus for packing off a well tool in a well ore containing a well fluid, said apparatus including tubular, telescopically arranged members, an expandable packing element disposed between facing abutment portions formed on said members and arranged to move between expanded and contracted positions in response to relative movement of said members between at least two longitudinal positions, one of said members having a recess therein and sealing means near each end of the recess thereby forming a sealed chamber between said members for receiving a fluid, the other member having upper and lower members sealingly received in said recess, selectively operable bypass means in said members for passing fluid around said upper member or preventing passage of fluid, a reference pressure chamber formed in one of said members, and a port connecting said reference chamber and said sealed chamber, said lower member sealing off said port when said telescopically arranged members are in one of said positions.

15. An apparatus for packing off a well tool in a well ore containing a well fluid, said apparatus including tubular, telescopically arranged members, an expandable packing element disposed between facing abutment portions formed on said members and arranged to move between expanded and contracted positions in response to relative movement of said members between at least two longitudinal positions, one of said members having a recess therein and sealing means near each end of the recess thereby forming a sealed chamber between said members for receiving a fluid, the other member having upper and lower members sealingly received in said recess, bypass means in one of said members for passing fluid around said upper member, a reference pressure chamber formed in one of said members, a port connecting said reference chamber and said sealed chamber, said lower member sealing off said port when said telescopically arranged members are in one of said positions, and valve means in said bypass means for opening and closing said bypass means, said valve means having a valve control element in fluid communication with the reference pressure chamber and another portion in fluid communication with the outside of said telescopically arranged members, said valve control element being controlled by pressures in said pressure chamber and outside of said members to open and close said bypass means.

16. An apparatus for packing off a well tool in a well bore containing a well fluid, said apparatus including tubular, telescopically arranged members, an expandable packing element disposed between facing abutment portions formed on said members and arranged to move between expanded and contracted positions in response to relative movement of said members between at least two longitudinal positions, one of said members having a recess therein and sealing means near each end of the recess thereby forming a sealed chamber between said members for receiving a fluid, the other member having upper and lower members sealingly received in said recess, bypass means in one of said members for passing fluid around said upper member, means in said upper member permitting fluid flow in one direction through said upper member while preventing fluid flow in the other direction, means in said lower member permitting fluid flow in either direction through said member, a reference pressure chamber formed in one of said members, a port connecting said reference chamber and said sealed chamber, said lower member sealing off said port when said telescopically arranged members are in one of said positions, and valve means in said bypass means for opening and closing said bypass means, said valve means having a valve control element in fluid communication with the reference pressure chamber and another portion in fluid communication with the outside of said telescopically arranged members, said valve control element being controlled by pressures in said pressure chamber and outside of said members to open and close said bypass means.

17. Apparatus in a well bore containing a well fluid for flow testing a well including, telescopically arranged members movable between spaced longitudinal positions, each of said members having a separate passageway, means forming a sampling chamber in said members, valve means in said members operative in one of said longitudinal positions for placing said passageways in fluid communication with said sampling chamber and operative in the other of said longitudinal positions for isolating said chamber from said passageways, packer means coupled to said members, said packer means including telescopically mounted members, a packer element disposed on one of said packer members and arranged to be expanded by relative motion between said telescoping packer members, and hydraulic means for releasably holding said telescoping packer members against movement when said element is expanded.

18. A well tool having telescopically mounted members adapted for coupling in a string of pipe and passage through a well bore containing well fluids for the purpose of testing earth formations comprising:

flow tester means including members telescopically arranged for movement between expanded and contracted positions, each of said members having separate passageways and valve means responsive to positioning of the members in said positions to place said passageways into or out of fluid communication with one another, means forming a sampling chamber in said members, said valve means likewise placing said chamber into and out of fluid communication with said passageways in response to positioning of the members, said tester means further having means for delaying the movement of said members to a position where said valve means is open while permitting rapid movement of said members to said other position to close said valve, and packer means coupled to said tester means and including a packer element for packing off the well bore and means for directing fluids from earth formations below said packer element to said flow tester, said packer element being disposed between telescopically mounted members so as to expand upon relative movement therebetween, said packer means further having hydraulic means for releasably holding said packer telescopic members in a position where said element is expanded.

19. A well tool for use in a well bore comprising:
telescopically-mounted tester members having separate upper and lower passageways and having ends adapted for coupling in a string of pipe, tester members being movable between at least two longitudinal positions, means forming a sampling chamber between telescopic portions of said tester members, valve means in said tester members operative for connecting said upper and lower passageways and sample chamber in one of said positions to permit fluid to pass through said sampling chamber from one of said passageways to the other of said passageways, and operative in said other position for closing said sampling chamber, telescopically arranged packer members coupled to said tester members, a packer element disposed between portions of said packer members and operative upon relative movement of said packer members to move between expanded and contracted positions, said packer members having a fluid chamber formed therebetween for receiving fluid, one of said packer members having a portion forming a piston in said fluid chamber, means in one of said packer members forming a bypass for passing fluid around said piston, and selectively operable valve means for opening and closing said bypass.

20. Apparatus for testing earth formations and sampling formation fluids at formation conditions comprising:
means arranged for suspension in a well bore on a string of pipe including a well tool and a packer means, said well tool including telescoping members and means providing a sample chamber therein, said packer means being expandable to isolate a section of the earth formations, valve means in said well tool operable in response to telescoping movement of said members for opening and closing said well tool to flow formation fluids therethrough and into said string of pipe, means for releasably holding said packer means in an expanded position to permit opening and closing said valve means, without retracting said packer means so that said valve means can be repeatedly operated by opening and closing same during the testing of a single isolated section of earth formations, means for measuring the pressure of the formation fluids while the section of formation is being tested, and means for trapping a sample of the formation fluid in said sample chamber within said well tool prior to release of the packer means whereby said packer means and well tool can be retrieved to the surface with a trapped sample of formation fluids substantially at formation conditions.

21. Well apparatus for use in a well bore comprising:
tester means, bypass means and packer means arranged for coupling to one another and adapted for passage through a well bore on a string of pipe, each of said means including a telescopically arranged mandrel and housing arranged for coupling to the string of pipe, said tester mandrel and housing arranged for movement between longitudinally spaced positions and having separate passageways, means forming a sampling chamber in said tester, valve means in said tester operative in one of said longitudinal positions for placing said passageways in fluid communication with said sampling chamber and operative in the other of said longitudinal positions for isolating said sampling chamber from said passageways, a fluid bypass port formed in the wall of the bypass housing and providing a fluid connection between the exterior of the bypass housing and the interior of the bypass mandrel, said bypass mandrel and housing relatively movable between at least two positions and means between said bypass mandrel and housing to seal off said port in one of said positions and open said port in the other position, means for retarding relative movement between said bypass mandrel and housing when said bypass port is closed while permitting unretarded movement of said bypass mandrel and housing to said other position to close said port, telescopically arranged packer members coupled to said tester members, a packer element disposed between portions of said packer mandrel and housing and operative upon relative movement of said packer mandrel and housing to move between expanded and contracted positions, said packer mandrel and housing having a fluid chamber formed therebetween for receiving fluid, said packer mandrel having a portion forming a piston to be received in said fluid chamber, means in said packer housing forming a passage for bypassing fluid around said piston, and selectively operable valve means for controlling fluid flow through said passage.

22. Apparatus in a well bore containing a well fluid for flow testing a well including, telescopically arranged tester members movable between spaced longitudinal positions, valve means in said tester members for controlling flow through said tester members in said positions, packer means including telescopically mounted packer members and a packer element disposed on one of said packer members, said packer element arranged to be expanded by relative motion between said telescoping packer members, hydraulic means for releasably holding said telescoping packer members against movement when said packer element is expanded, said hydraulic means including a fluid chamber formed between said packer members for receiving fluid, one of said packer members having a portion forming a piston in said chamber, a passage in said piston for bypassing fluid through said piston, means in said passage for preventing fluid flow through said piston in one direction while permitting fluid flow in the other direction, a restricted orifice formed on one of said members for permitting a slow leak of fluid around said piston, bypass means including telescopically mounted bypass members, said bypass members being movable between expanded and contracted positions and including valve means providing a fluid communication path between the exterior and interior of the well apparatus in one of said positions, and means for retarding relative movement between said bypass members when said bypass valve means is closed while permitting unretarded movement of said bypass members to said other position to close said bypass valve means.

23. Well apparatus for use in a well bore comprising:

tester means, bypass means and packer means arranged for coupling to one another and adapted for passage through a well bore on a string of pipe, each of said means including a telescopically arranged mandrel and housing, means for coupling the tester mandrel to a string of pipe, the bypass mandrel to the tester housing, and the packer housing to the bypass housing, the packer mandrel susceptible of being fixed in position downwardly relative to the well bore, said tester mandrel and housing having spaced abutment means arranged for contact in spaced longitudinal positions for transmitting downward forces in said spaced longitudinal positions, fluid communication means through said tester including a sample chamber, valve means in said tester mandrel and housing operable in one of said spaced positions to block said fluid communication means and sample chamber and operable in another of said spaced positions for passing fluids through said sample chamber and fluid communication means, means for positioning said abutment means by reciprocating motion between said tester mandrel and housing, said tester further having hydraulic delay means for retarding longitudinal movement between said tester mandrel and housing when moving toward a position where said valve means are open, said hydraulic delay means having shunt means permitting relatively fast movement between said tester mandrel and housing when moving toward a position where said valve means are closed, said bypass mandrel and housing being movable between expanded and contracted positions and including valve means providing a fluid communication path between the exterior and interior of the well apparatus in one of said positions, means for retarding relative movement between said bypass mandrel and housing when said bypass valve means is closed while permitting unretarded movement of said bypass mandrel and housing to said other position to close said bypass valve means, said packer mandrel and housing arranged for relative longitudinal movement and having a fluid filled chamber therebetween, said packer means including a packer element and means for expanding and contracting said packer element by relative longitudinal motion of said packer mandrel and housing, and means for releasably trapping fluid in a portion of the fluid chamber between the packer mandrel and housing to retain the relative position of the packer mandrel and housing when the packer is expanded.

24. Well apparatus for use in a well bore comprising:

tester means, bypass means and packer means arranged for coupling to one another and adapted for passage through a well bore on a string of pipe;

each of said members including a telescopically arranged mandrel and housing arranged for coupling to the string of pipe, said tester mandrel and housing arranged for movement between longitudinally spaced positions and having separate passageways, means forming a sampling chamber in said tester, valve means in said tester operative in one of said longitudinal positions for placing said passageways in fluid communication with said sampling chamber and operative in the other of said longitudinal positions for isolating said sampling chamber from said passageways, said packer mandrel and housing arranged for relative longitudinal movement and having a fluid filled chamber therebetween, a packer element, and means for expanding and contracting said packer element by relative longitudinal motion of said packer mandrel and housing, means for releasably trapping fluid in a portion of the fluid chamber between the packer mandrel and housing to retain the relative position of the packer mandrel and housing when the packer is expanded, said bypass mandrel and housing being movable between expanded and contracted positions and including valve means providing a fluid communication path between the exterior and interior of the well apparatus in one of said positions, and means for retarding relative movement between said bypass mandrel and housing when said bypass valve means is closed while permitting unretarded movement of said bypass mandrel and housing to said other position to close said bypass valve means.

25. A well tool adapted for coupling in a string of pipe and passage through a well bore containing well fluids for the purpose of testing earth formations comprising:

flow tester means including members telescopically arranged for movement between expanded and contracted positions, each of said members having separate passageways and valve means responsive to positioning of the members in said positions to place said passageways into or out of fluid communication with one another, said tester means further having means for delaying the movement of said members to a position where said valve means is open while permitting rapid movement of said members to said other position to close said valve, packer means including a packer element for packing off the well bore and means for directing fluids from earth formations below said packer element to said flow tester means, said packer element being disposed between telescopically mounted members so as to expand upon relative movement therebetween, said packer members having a fluid chamber formed therebetween for receiving fluid, one of said packer members having a portion forming a piston in said chamber, means in one of said packer members forming a passage for bypassing fluid around said piston, said passage including a valve responsive to differential pressures for closing said passage to hold said packer members in a position where said element is expanded, bypass means having telescopically mounted members adapted for coupling between the tester and packer means, said bypass members being movable between expanded and contracted positions and including valve means providing a fluid communication path between the exterior and interior of the well apparatus in one of said positions, and means for retarding relative movement between said bypass members when said bypass valve means is closed while permitting unretarded movement of said bypass members to said other position to close said bypass valve means.

26. Apparatus for packing off a well bore comprising:

telescopically mounted parts arranged for relative longitudinal movement, said parts having a fluid filled chamber therebetween, a packer element, and means for expanding and contracting said packer element by relative longitudinal motion of said parts, means for releasably trapping fluid in a portion of the fluid chamber between the parts to retain the relative position of the parts when the packer is expanded.

27. Packer means including tubular, telescopically arranged members, a packer element disposed between portions of said members and operative upon relative movement of said members to move between expanded and contracted positions, said members having a fluid chamber formed therebetween for receiving fluid, one of said members having a portion forming a piston in said chamber, means in said one member including a bypass for passing fluid through said piston, said bypass including valve means controlling flow through said bypass, means for trapping fluid at hydrostatic pressure, and means placing said valve means in fluid comunication with fluid below said packer and with fluid within said trapping means so that said valve means is responsive to differential pressure of the trapped fluid and formation fluids when said packer element is expanded to close said bypass.

28. Apparatus for packing off well fluids from formation fluids in a well bore, telescopically mounted parts arranged for relative longitudinal movement, said parts having a fluid filled chamber therebetween, a packer element, and means for expanding and contracting said packer element by relative longitudinal motion of said parts, means in one of said parts for trapping a fluid at hydrostatic pressure, and means for releasably trapping fluid in a portion of the fluid chamber between the parts to retain the relative position of the parts when the packer is expanded including valve means in fluid communication with the well bore below the packer element and the trapped fluid under hydrostatic pressure, said valve means being responsive to a pressure differential between the fluid under hydrostatic pressure and the pressure of formation fluids for trapping fluid in the fluid chamber between the parts, said valve means being responsive to equalization of pressures between the fluids under hydrostatic pressure and formation fluids in the well bore below the packer element for releasing said trapped fluid between the parts thereby releasing said parts from said relative position.

29. An apparatus for use in a well bore containing a well fluid, said apparatus including tubular, telescopically arranged members, one of said members having a recess therein and sealing means near each end of the recess thereby forming a sealed chamber between said members for receiving a fluid, the other member having upper and lower members sealingly received in said recess, bypass means in one of said members for passing fluid around said upper members, a reference pressure chamber formed in one of said members, a port connecting said reference chamber and said sealed chamber adapted to be closed or opened by said lower member, valve means in said bypass means for opening and closing said bypass means, said valve means having a valve control element in fluid communication with the reference pressure chamber and another portion in fluid communication with the outside of said telescopically arranged members, said valve control element being controlled by pressures in said pressure chamber and outside of said members to open and close said bypass means, and restricted bypass means in said valve control element permitting a slow leak of fluid between said reference pressure chamber and the outside of said members.

30. A method of testing earth formations and sampling formation fluids at formation conditions comprising the steps of:

suspending in a well bore on a string of pipe a valved well tool and expandable packer, expanding the packer to isolate a section of the earth formations, cyclically operating the valved well tool more than once by opening and closing the valved tool to flow formation fluids through a chamber therein and thence into the string of pipe, recording the pressures of the formation fluids while the valved tool is being operated, finally closing the valved tool to trap and confine the last flowing sample of the formation fluid at formation conditions within the chamber prior to release of the packer, releasing the packer to retract it, and retrieving the packer and well tool to the surface to inspect the formation fluid trapped within the chamber.

31. A well tool comprising: inner and outer members telescopically movable between expanded and contracted relative positions, each of said members having a passageway, means forming an enclosed sample chamber between said member, intermediate said passageways; and valve means between said members for selectively communicating said sample chamber with both of said passageways in one of said relative positions so that fluid can flow from one of said passageways to the other via said sample chamber and for selectively isolating said sample chamber from both of said passageways in the other of said relative positions so that a sample of the fluid can be trapped and confined within said sample chamber.

32. A well tool comprising:

inner and outer members telescopically movable between expanded and contracted relative positions, each of said members having a passageway;

means forming a sample chamber intermediate said passageways;

valve means between said members for selectively communicating said sample chamber with both of said passageways in one of said relative positions so that fluid can flow from one of said passageways to the other via said sample chamber and for selectively isolating said sample chamber from both of said passageways in the other of said relative positions so that a sample of the fluid can be trapped and confined within said sample chamber;

and removable closure means terminating one of said passageways, removal of said closure means being effective to directly communicate said passageways in both of said positions.

33. A well tool for testing formation fluids in a well bore comprising:

inner and outer members telescopically movable between expanded and contracted relative positions, a portion of one of said members being laterally recessed relative to the other of said members to define a sample chamber between said members; a fluid passageway in said inner member; another fluid passageway in said outer member; and valve means between said members for selectively communicating said passageways with said sample chamber so that formation fluids can flow from one of the passageways to the other via said chamber when said members are in one of said positions and for isolating said sample chamber from both of said passageways in the other of said positions to trap a sample of formation fluids in said sample chamber.

34. A well tool for testing formation fluids in a well bore comprising:
   inner and outer tubular members telescopically movable between first and second relative positions solely responsive to longitudinal movement of one of said members, a portion of one of said members being laterally spaced from the other of said members to provide an annular sample chamber between said members; a longitudinally extending fluid passageway in said inner member; another longitudinally extending fluid passageway in said outer member;
   and valve means on said members for selectively communicating said sample chamber with both of said passageways in one of said positions so that formation fluids can flow from one passageway to the other passageway via said sample chamber and for selectively isolating said sample chamber from both of said passageways in the other of said positions so that a sample of the fluid can be trapped in said sample chamber, said valve means including elements fluidly sealing between said members adjacent the ends of said sample chamber.

35. An apparatus for packing off a well tool in a well bore containing a well fluid,
   said apparatus including tubular, telescopically arranged members,
   packer means mounted on said members and operable in response to relative movement between said members,
   one of said members having a recess therein and sealing means near each end of the recess thereby forming a sealed chamber between said members for receiving a fluid,
   the other member having a piston sealingly received in said recess,
   bypass means in one of said members for passing fluid around said piston,
   and valve means in said bypass means selectively actuable in response to differential pressures for controlling the flow of said fluids passing around said piston and thereby controlling relative movement between said members.

References Cited by the Examiner

UNITED STATES PATENTS

| Re. 24,352 | 8/1957 | Comstock | 166—145 |
| 2,308,387 | 1/1943 | Potts | 166—152 |
| 2,661,802 | 12/1953 | Johnston | 166—150 |
| 2,901,001 | 8/1959 | Nutter | 166—152 X |
| 2,942,669 | 6/1960 | Mounce et al. | 166—226 X |
| 2,951,539 | 9/1960 | Malone et al. | 166—226 X |
| 2,982,358 | 5/1961 | Brown | 166—120 |
| 3,051,245 | 8/1962 | Andrew et al. | 166—148 X |
| 3,096,823 | 7/1963 | Crowe | 166—152 X |
| 3,105,553 | 10/1963 | Chisholm | 166—152 X |

CHARLES E. O'CONNELL, *Primary Examiner.*

D. H. BROWN, *Assistant Examiner.*